(No Model.)
L. L. SHATTUCK.
TARGET TRAP AND BIRD THEREFOR.
No. 542,377. Patented July 9, 1895.
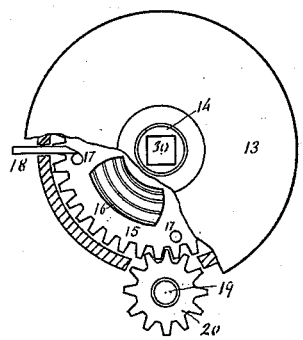
Fig. 2.
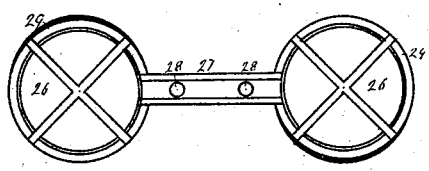
Fig. 4.
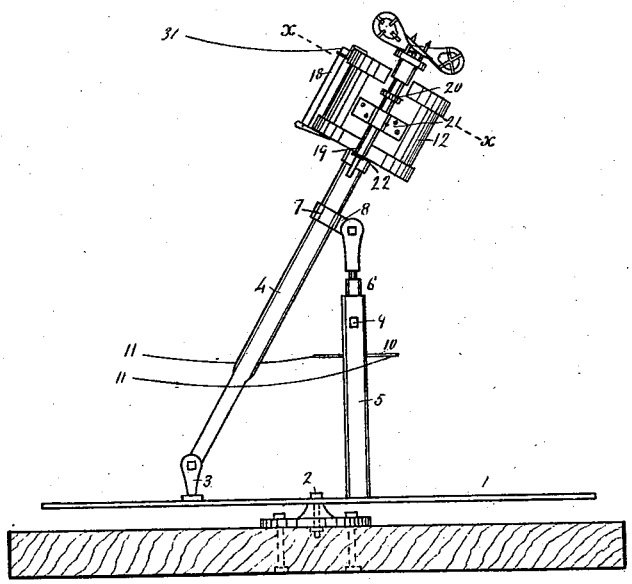
Fig. 1.
Fig. 3.
WITNESSES:
David Weed
F. B. Howland.
Leander L. Shattuck, INVENTOR
BY
Joseph Smith
ATTORNEY.

UNITED STATES PATENT OFFICE.

LEANDER L. SHATTUCK, OF TITUSVILLE, PENNSYLVANIA, ASSIGNOR TO CERELLE SHATTUCK, OF SAME PLACE.

TARGET-TRAP AND BIRD THEREFOR.

SPECIFICATION forming part of Letters Patent No. 542,377, dated July 9, 1895.

Application filed November 22, 1894. Serial No. 529,597. (No model.)

*To all whom it may concern:*

Be it known that I, LEANDER L. SHATTUCK, a citizen of the United States, and a resident of Titusville, in the county of Crawford and State of Pennsylvania, have invented a new and useful Improvement in Traps and Birds for Trap-Shooting, of which the following is a specification.

My invention relates to one of those devices used by sportsmen as a substitute for live birds in shooting matches or pleasure shooting, my object being to make a target, or what is called a "sportsman's gyro," which, when thrown into the air in its motion, shall closely resemble the erratic flight of a live bird, and which, when struck by a shot, shall give in the air a distinct explosion visible to the eye. To accomplish this it is necessary that a peculiar trap should be constructed, and therefore I have devised the trap herein described and ask for Letters Patent for both the flying target and the trap from which it is thrown, as each is a complement of the other.

In my invention I construct the gyro or bird similar in shape to the opposite vanes of a windmill with the connecting-shank. The trap is constructed to give the bird a rapid rotary motion and at the time of its most rapid motion to release it arbitrarily from the trap, when the rotation, the wings acting on the air, causes the bird to rise and, taking an erratic course, flies in much the same way that a live pigeon would take under similar circumstances. In circular openings in the wings may be placed flat disks of paper containing a small amount of percussion-powder, which, when struck by a shot, explodes, making a puff of smoke, shattering and scattering pieces of the paper resembling the feathers of a bird, giving plain evidence of the success of the marksman. I accomplish all this in the manner illustrated in the accompanying drawings, in which—

Figure 1 is a side view of the trap as mounted on the base and with the bird in position ready to be sprung; Fig. 2, a top or end view of the trap, enlarged, on line *x x* of Fig. 1, showing the cover as broken to reveal a portion of the interior sufficient to illustrate the mechanism; Fig. 3, a sectional longitudinal view, also enlarged, of the spindle on which the bird rests, showing the device for releasing the bird at the proper time; and Fig. 4, a top of the bird.

In the several figures the same numbers are used to indicate the same or similar parts.

1 is a base-bar secured by a pivot-bolt 2 to a plank or foundation of any suitable nature; 3, a short upright support attached firmly to the base 2, to the upper end of which is attached by a hinge-joint the bar 4, which supports the trap proper. 5 is a hollow upright tube, also attached firmly to the base 1, in which telescopes the rod 6.

7 is a collar sliding on the bar 4, having the arm 8 connected to the upper end of the rod 6 by a hinge-joint. 9 is a set-screw in the tube 5 for holding the rod 6 in any desired position.

10 is a cross-arm on the tube 5, to the ends of which are attached the cords of wires 11 11, leading to the hand of the operator. (Not shown.)

It will be seen that the bar 4 and trap may be adjusted at any inclination by moving the rod 6 up or down in the tube 5, while the horizontal direction may be controlled by the operator by means of the cords 11 11, the whole trap revolving on the bolt 2.

The trap proper 12 is shown more in detail in Figs. 2 and 3, which are more enlarged.

13, Fig. 2, is a cylindrical case having in the center the shaft 14, to which is attached the toothed wheel 15. Attached to the shaft 14 is the coiled spring 16.

17 17 are pins on the wheel 16. (Others not shown.)

18 is a latch engaging with the pins 17, preventing the wheel 15 from springing back when the spring is wound up.

19, Fig. 3, is a sleeve attached to the shell of the cylinder 13, having the toothed pinion 20 meshing in the wheel 16. This shaft is journaled in the brace 21, which is firmly attached to the cylinder 13, and it also rests on the bracket 22. On the upper end of the shaft is the head 23, and from this the pins 24 24 project upward. The sleeve 19 is hollow and has in the interior the spindle 25. This is threaded for a considerable portion of its length, and a small portion of the interior of the shaft 19 is interiorly threaded to fit the threads on the spindle 25. The lower end of the spindle 25 is flattened and passes through a slot in the bracket 22, which prevents it from turning with the sleeve 19, but which allows of a sliding motion up and down, with the result that when the sleeve 19 is revolved the spindle 25 is raised or lowered by the engagement of the threads.

The bird is shown in plan in Fig. 4 consisting of a plate of thin steel or other suitable material, cut substantially in the form shown, of two wings 29 29, connected by a shank 27. In the shank are two holes 28 28, corresponding to the two pins 24 24 on the head of the sleeve 19. The wings are tilted upward and are also inclined laterally in opposite directions like the opposite sails of a windmill. In each wing are the holes or openings 26 26. These holes are fitted to receive flat disks of paper or light material, which contain a small quantity of percussion or detonating powder. The disks are not shown in the drawings.

The operation of the trap is as follows: When desired for use the trap is placed in the field and the spring 16 wound up by a key inserted in opening 30 in the protruding end of the shaft 14, the latch 18 allowing the pins 17 to pass but not to return. Of course the sleeve 19 is also revolved, and the spindle 25, having been previously properly adjusted, is drawn down, so that when the spring is wound up the upper end is drawn within the sleeve 19. The bird is then placed on the pins 24 and the cord 31 is led from the latch 18 to the hand of the operator. The operator then directs the horizontal direction of the trap as he chooses by means of the cords 11 11, and when ready pulls the cord 31, releasing the latch 18 from the pins 17, when the spring is released, and the shaft 14 revolving communicates a more rapid motion to the sleeve 19 and bird, which in turn presses up the spindle 25, which lifts the bird until the revolutions have attained their maximum, at which time the spindle 25 lifts the bird clear off from the pins 24. The bird is then free from the trap, and in its rapid revolution the wings act on the air and raise it, when it takes an erratic course, depending on the currents of the air. The wings being tilted from the horizontal present a better surface to the marksman. If a shot strikes the bird, especially in the paper disk, the concussion causes the percussion-powder to explode, giving a slight detonation and a puff of smoke, plainly visible to the eye, and shatters the paper, which falls like the feathers of a bird.

The frame of the bird is made, preferably, of thin sheet-steel, so as to offer little resistance to the air in its rotary motion. It may be of any other metal or of paper pressed in the right form and with depressions for holding the powder.

I am aware that traps have been made to give a rotary motion to the bird as discharged from the trap; also, that a bird has been made of a similar form to the one here described. The principal points in which I claim an improvement is in having the wings tilted upward, so as to expose a better surface to the marksman and in having an explosive powder in the wings to more plainly mark the effect of the shot.

I claim as my invention—

1. A trap for trap shooting; consisting of the shaft 14 located centrally in a cylindrical case 13, the coiled spring 16 connected at the ends with the shaft and the walls of the cylindrical case respectively and operating when released to drive the shaft 14, the toothed pinion 15 on said shaft meshing into and driving the pinion 20 on the sleeve 19; the sleeve 19 being held in place and supported on the interior spindle 25 which is exteriorly threaded and fitting with interior threads in the sleeve 19; said spindle being flattened and passing through a slot in the bracket 22, thereby being prevented from turning with the sleeve 19; the head 23 and pins 24 on said sleeve 19; the pins 17 on the pinion 15 and latch 18 holding the pinion until released; all operating in combination substantially as described and for the purposes herein set forth.

2. A target or bird, for trap shooting; consisting of the shank 27, wings 29, constructed inclined and tilted as described, and with openings in each wing fitted to receive flat disks of paper, and with holes 28 fitted to be loosely adjusted on the pins 24; substantially as shown and described.

3. A trap and bird for trap shooting; consisting of the shaft 14 located centrally in a cylindrical case 13; the coiled spring 16 connected at the ends with the shaft and the walls of the case respectively and operating when released to drive the shaft 14; the toothed pinion 15 on said shaft meshing into and driving the pinion 20 on the sleeve 19, the sleeve 19 being held in place and supported on the spindle 25, which is externally threaded fitting with interior threads in the sleeve 19, said spindle being flattened at the lower end and passing through a slot in the bracket 22, thereby being prevented from turning with the sleeve 19; the head 23 and pins 24 on said sleeve 19; the target or bird consisting of the shank 27, wings 29, constructed inclined and tilting as described and with openings in each wing fitted to receive flat disks of paper, and with holes 28 in the shank fitted to be loosely adjusted on the pins 24; the pins 17 on the pinion 15, and latch 18 for holding the pinion till released; all the parts operating in combination and mounted on a revolving and adjustable base substantially as described and for the purposes herein set forth.

LEANDER L. SHATTUCK.

Witnesses:
F. B. HOWLAND,
J. J. HOLDEN.